Patented May 14, 1946

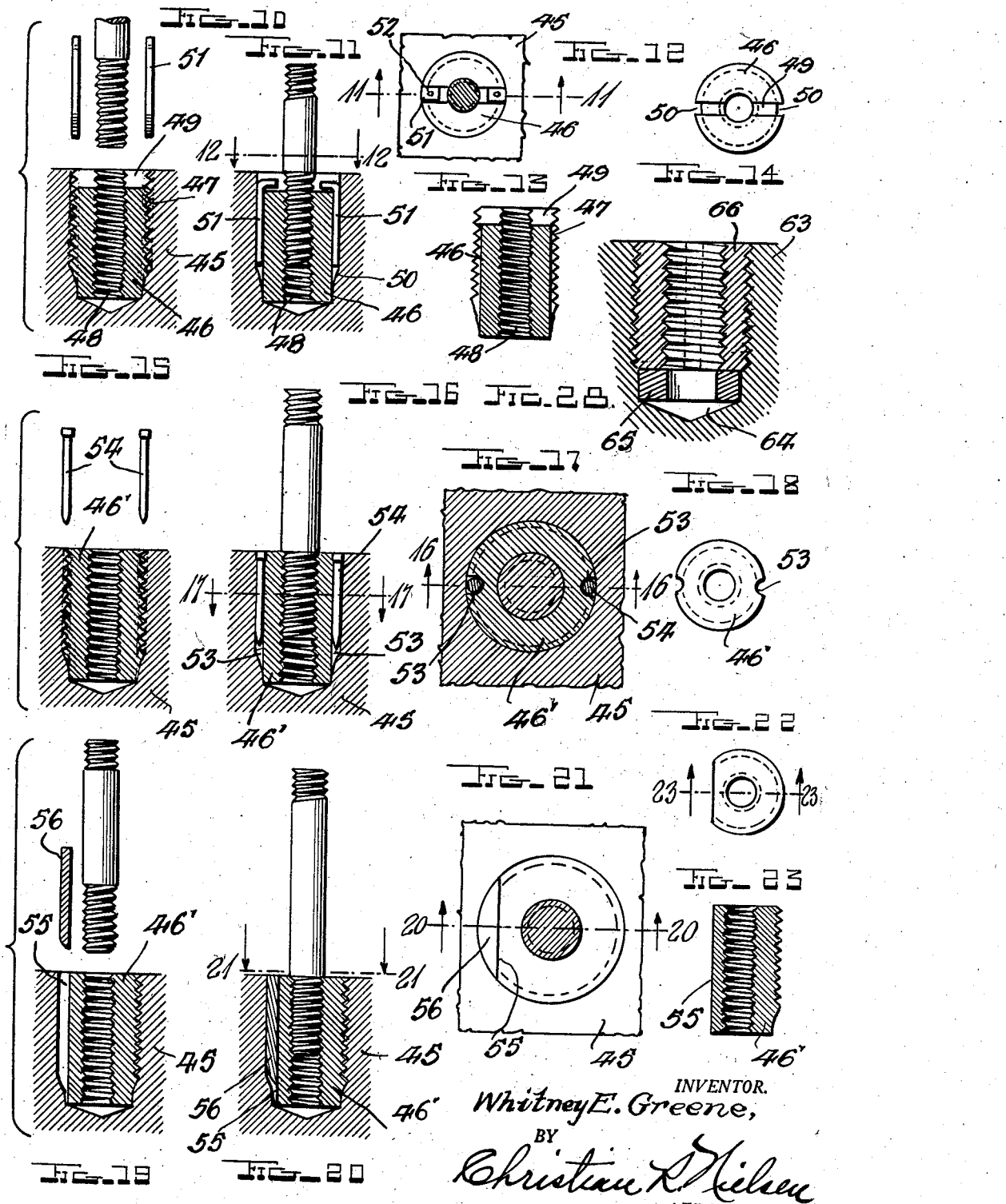

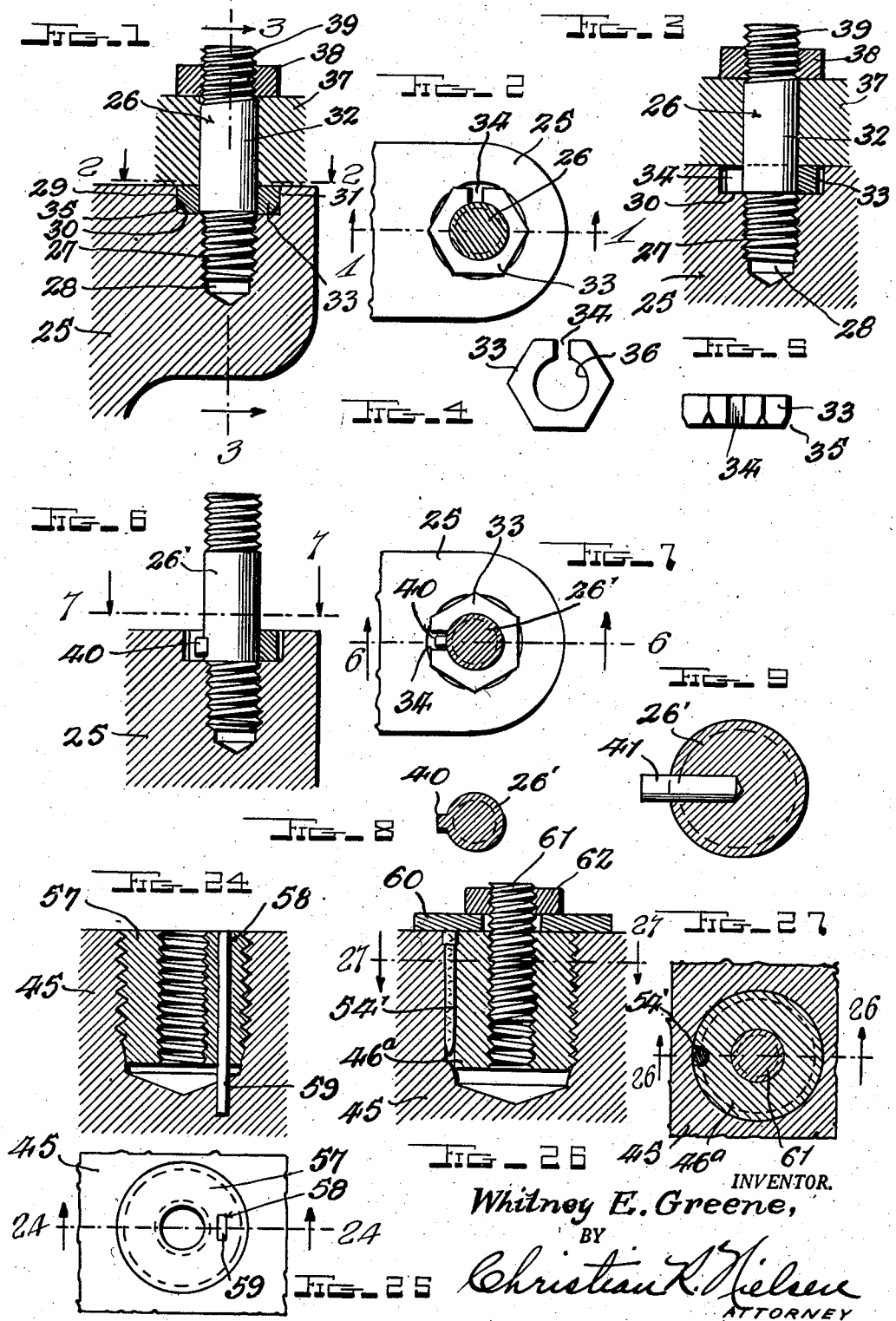

2,400,348

UNITED STATES PATENT OFFICE 2,400,348

ANCHORAGE INSERT FOR SCREW-THREADED FASTENINGS

Whitney E. Greene, Hollywood, Calif.

Application May 15, 1943, Serial No. 487,156

3 Claims. (Cl. 85—32)

The invention has for an object to provide insert devices suitable for mounting bolts or nuts upon relatively soft materials, to the end that parts may be secured together, brackets secured in place, or elements removably secured upon bodies of relatively soft materials, especially wood, although the invention is also applicable to the use of inserts in metals of various kinds, as might be desirable in the case of soft metals such as aluminum, lead, and the like.

My invention derives especial importance at present from the past developments of plywood construction, particularly as used in aircraft, and my invention enables attachment of parts together or the application of screw-threaded fastenings for the attachment of members or parts to plywood constructions with a minimum liability of loosening of the fastenings, and with the attainment of greater security, greater facility of use of fastenings required to be removed from time to time, and increasing the field of use of fastenings or removable parts upon or in plywood construction with enhanced security. It is also an aim of my invention to enable the attachment of plywood parts together and the mounting of members upon plywood constructions without the liability of enlargement of openings or the deformation of key or slot parts in openings which receive fastening members, and also to eliminate the abrasion and wear of the wood surfaces which is ordinarily involved by the insertion of bolts through plywood structures, and the application of nuts over washers thereon.

It is an especially important aim of my invention to present a means for mounting female or stud inserts in wood by the use of screw threads engaging the wood structure to hold the insert elements against withdrawal, and with the requirement of a minimum depth of insertion of the insert, while yet sustaining ample strength and security in the mounting elements thereon.

Another important aim of the invention is to present a novel construction of locking device and shear-stress-sustaining member such as a stud or other insert, to the end that shear stresses upon studs or the like set in wood may be safely sustained without liability of loosening of the members mounted in the wood, and without liability of working loose of the insert in the wood structure. It is an important purpose also to combine a locking means and shear-stress-sustaining function in a single element and simple form. A further aim in this connection is to embody four functions in the locking and shear stress sustaining means, and that is to provide not only an anchor means to lock the insert member against rotation by mere keying of the insert to the locking means as well as distributing shear stresses over a wide area in a support structure, but, in addition, to provide for an automatic adaptation of the locking means to the size of the insert, produced by a functioning of the article resultant upon its application to the work.

Another object of the invention is to present a novel method of keying an insert to the body structure upon which it is applied.

I am aware that a locking means has been provided for screw-threaded inserts, consisting of a ring interiorly and exteriorly serrated, the insert being also serrated just within the ring, but these serrated rings occasionally drop out before final assembly, and the inherent requirements of manufacture and manner of use of such article prevent it from functioning properly for sustaining shear stresses transmitted to the insert, and it is an object of my invention to overcome this deficiency.

Additional objects, advantages and features of invention reside in the construction, arrangement and combination of parts involved in the embodiment of my invention, as will be more readily understood from the following description and accompanying drawings, wherein Figure 1 is a fragmentary sectional view of a body structure such as might be made of wood, in which there is set a stud bolt by the use of my invention, a removable body piece being shown as secured to the structural member by means of a stud bolt and a nut engaged thereupon.

Figure 2 is a top view of Figure 1, with the secured member and nut removed, being in section on the line 2—2 of Figure 1, the plane of the section of Figure 1 being indicated by the line 1—1 in Figure 2.

Figure 3 is a sectional view at right angles to Figure 1, on the line 3—3 of Figure 1.

Figure 4 is a detail top view of the locking members for the stud applied to the base structure in which the stud is set.

Figure 5 is an edge view of the locking member of Figure 4.

Figure 6 is a sectional view similar to Figure 1, showing a modification, taken on the line 6—6 of Figure 7.

Figure 7 is a top view with the stud in section on the line 7—7 of Figure 6.

Figure 8 is a section through the key element of the stud, detached, as shown in Figures 6 and 7.

Figure 9 is a section of a large diameter stud and manner of forming the key element thereof.

Figure 10 is a sectional view of a support body structure and of a female insert set therein, showing the key fastenings for the inserts, and a bolt or stud member in position to be engaged with the insert.

Figure 11 is a similar view with the fastening devices and stud element engaged, taken at right angles to Figure 10, on the line 11—11 of Figure 12;

Figure 12 is a top view of the structure of Figure 11, with the stud member in section, on the line 12—12 of Figure 11.

Figure 13 is a detail of the female insert member detached.

Figure 14 is a top view of the insert member alone.

Figure 15 is a view similar to Figure 10, showing a modification of the female insert.

Figure 16 is a view similar to Figure 11, showing the fastening for the insert engaged and a stud set in the insert, this view being taken on the line 16—16 of Figure 17.

Figure 17 is a horizontal sectional view on the line 17—17 of Figure 16.

Figure 18 is a top view of the insert member of the last three views.

Figure 19 is a view similar to Figures 10 and 15, of a further modification of the female insert showing a key fastening for the insert and a stud member, both in position for engagement with the insert.

Figure 20 is a view similar to Figure 19, showing the key fastening and stud engaged, this figure being taken on the line 20—20 of Figure 21.

Figure 21 is a top view of the work in Figure 20, with the stud in section on the line 21—21 of Figure 20, this view being greatly enlarged.

Figure 22 is a top view of the female insert of the preceding figures, and

Figure 23 is a vertical longitudinal section of the insert on the line 23—23 of Figure 22.

Figure 24 is a vertical sectional view of a support body structure with the female insert engaged therein, showing a modification of the key fastening.

Figure 25 is a top view of the structure of Figure 24.

Figure 26 is a vertical sectional view of a further modification of the female insert and its fastening, on the line 26—26 of Figure 27, while Figure 27 is a horizontal sectional view on the line 27—27 of Figure 26.

Figure 28 is a longitudinal sectional view of a further modification of the insert and work in which it is engaged, representing a simplification of the insert and its fastening.

There is illustrated in Figures 1 to 5, a form of the invention especially adapted to be embedded as a stud in a body structure, by means of which other parts may be secured to the body structure, either removably or permanently, as desired.

The illustrations in the several views are full size of embodiments of the invention as heretofore used, although it is adapted to be produced in larger and smaller sizes, as will be readily appreciated. On the drawings, a portion of a body structure is shown, such as might be formed of wood, or other yielding material, and this may include some of the modern plastics, and also soft metals, as will be readily appreciated, the body being designated at 25. The body is shown as drilled to a depth suitable for reception of a stud 26, this stud being conventionally threaded at its inserted end, as at 27, these threads being comparatively coarse. The drilled opening or bore 28 is preferably of less diameter initially than the threaded portion of the stud, and is surrounded by a rabbet 29 concentric with the drilled opening, this rabbet having a flat bottom or shoulder 30 beside the bore, and having cylindrical side walls 31, as initially formed. The lower threaded portion of the stud 26 extends only sufficiently to permit the stud to screw into the bore 28 until the extremity of the stud is near the bottom of the bore, and the unthreaded cylindrical portion 32 of the stud extends to the shoulder 30. In the case of wood, plastics and other materials of correspondingly yieldable nature, the bore 28 is formed as stated, with a diameter slightly less than that of the threaded part of the stud and is cut smooth, the stud being screwed into the material 25 in such manner as to compress the surrounding material and cause the latter to fit into the threads of the stud. In harder materials the size of the bore 28 may be specially proportioned to the diameter of the threaded part of the stud engaged therein to permit a more or less flowing conformation of the material 25 to the threaded part of the stud without excessive compression such as might tend to split or fracture the material 25.

A locking member 33 is provided, which in the present instance is substantially in the form of a hexagonal nut blank, split at one side so as to form a C-shape, with a slight gap 34, this C-shaped locking member being of substantial thickness in proper proportion to the density of the material 25, and ordinarily, for use in wood, its thickness is slightly less than half the length of the threaded inner portion of the stud. The locking member is slightly bevelled at its angular part, which constitutes the lower part of the locking member, as illustrated at 35 and the circular inner side 36 of the locking member may be smoothly finished and substantially cylindrical with a diameter approximating that of the smooth portion 32 of the stud, or slightly less. The diameter of the locking member 33 across opposite angles thereof is slightly greater than the diameter of the enlargement of the opening in the work 25 formed by the rabbet 29, so that when the lock is set around a stud 26 engaged in the bore 28, the angles of the lock set out over the material 25 slightly beyond the rabbet, substantially as indicated in Figure 2, more or less. The lock is also preferably of a size to snugly fit the smooth portion 32 of the stud, and it may be initially slightly smaller in size, so that it is sprung slightly in order to engage around the portion 32, requiring a slight driving fit, although this is not entirely essential, and the lock may be slightly larger than the portion 32 and still function for the purposes in view, as will be disclosed.

In the assembly of the parts, the bore 28 being drilled properly and rabbet 29 formed, the stud is introduced and screwed into the bore, without the locking collar 33 in final position, although it may be disposed upon the stud so as to lie above the material 25 while the stud is being screwed into place. After the stud is screwed home, substantially as shown in Figure 1, a driving tool is engaged with the lock 33 and force applied sufficient to press or drive the lock collar longitudinally downward around the stud and into the material 25, to the position or substantially the position shown in Figure 1, although the lock lap device may lie slightly below the circumjacent outer surface of the material 25, as will be understood. The stud being so mounted, parts, objects, or materials to be secured to the body structure 25 may then be engaged upon the body 25 around the stud, substantially as shown at 37, and secured in place by means of a nut or the like 38, screwed upon an outer threaded portion 39 of the stud, the threads of this part conforming to usual practices in machine screws and the like.

By this construction, shear stress transmitted from the attached part 37 to the stud will be communicated by the stud to the lock collar 33 first, and by the latter transmitted to the material 25 over an extremely enlarged area, so that the liability of the stud working loose in the material 25 will be greatly minimized, as will be appreciated. At the same time, the stud is held and locked against rotation by the compression of the locking member 33 thereupon, and engagement of the angles of the lock member in the material 25. The locking of the member 33 upon the stud 26 is enhanced or increased, and may be alone caused by, the wedging of the lock member in the material as it is forced downwardly into the rabbet 29, the material 25 pressing in upon the sides of the lock member so as to compress it against the stud. This at the same time minimizes the liability of opening the lock member by tendency of the stud 26 to lean or work under shear stresses, as will be readily understood. The material of the stud may correspond to the material customarily used in stud bolts and machine screws or other screws, depending upon the nature of the materials used, and the stresses being sustained by the fastenings which comprises the whole assembly as illustrated in Figure 1.

In Figures 6 to 8, inclusive, the construction which may conform to that previously described is employed, except that in addition, a key lug 40 is formed upon the stud close to the lower threaded portion, so as to lie within the rabbet 29, the stud 26 in this instance being either formed with a complete encircling collar thereon initially, or the lugs may be formed by other familiar methods for forming corresponding parts, of which there are a number well known. In the use of this form of the invention, the parts are assembled as first described, and when the lock 33 is put in place, it is positioned with the gap 34 aligned with the lug 40, and then pressed into place, so that the lug 40 enters the gap, as shown in Figures 6 and 7. The lug for this purpose is made, preferably, slightly narrower than the gap 34 when the lock is in place. By this means any tendency of the stud 26' to rotate is prevented by engagement of the lug against one side or the other of the notched gap 34.

In cases where a very large stud is to be mounted, the key is made simply by forming a radial bore in the stud 26', which is otherwise substantially the same as the form shown at 26, and then a pin 41 set therein by a conventional practice. The outer end of the pin is proportioned and shaped so as to fit in the gap of the lock device, as will be appreciated, and serve as a lug.

In Figures 10 to 14, there is illustrated a means for mounting screws or studs in wood and other soft materials, and which is especially valuable in enabling the engagement of screws or other fastenings in plywood, so that a stud, or a fastening bolt will have a widely distributed and secure connection with the plywood. In this instance, the article is illustrated considerably enlarged, from its ordinary size, in Figures 10 to 14, a body material in which the fastening is engaged being indicated at 45, which would ordinarily be one-half an inch thick. The anchorage member in this instance consists of an interiorly threaded and exteriorly threaded tubular member, sleeve, or bushing 46, the external threads 47 upon which are of greater depth and pitch than the internal threads 48, and across the outer end of the bushing a slot 49 is formed, suitable for the reception of a screw-driver or the like, for engaging the bushing in the body material 45. At diametrically opposite sides external longitudinal key slots 50 are formed, these key slots being flat bottomed in the present instance, although they may be otherwise shaped, as will be indicated hereinafter, and in this instance, they are practically of the same, or slightly more than, the depth of the threads 47. Respective key pieces 51 are provided, adapted to be engaged slidably in these key slots, the outer ends of the key pieces being turned inwardly at right angles, so as to set in the strip slots 49 of the anchor piece, as shown in Figures 11 and 12.

The outer ends of the keys 51 may be apertured as at 52, to facilitate extraction, should that become necessary. These ends may be bent into the slots 49 after being driven into place.

In the use of the last described form of the invention, the body material 45 is bored to a depth sufficient to enable the anchorage piece to be screwed thereinto to its full depth, as shown in Figures 10 and 11, the bore being preferably of slightly smaller diameter than the external diameter of the anchor piece, so that the external threads of the anchor will compress the material surrounding the bore and become fitted thereinto, as will be understood.

This style of anchorage may also be used in quarter-inch plywood, that is to say, plywood having a total thickness of one-quarter inch, and is useful where brackets or other pieces or parts must be secured to such thin plywood in situations where a nut cannot be engaged with a bolt at the back of the plywood, and by the use of my invention the need for such nuts in most instances is obviated. Where the bracket or object to be secured is one that may be supported properly by, say, a No. 8 screw, with threads 32 to the inch, it is ordinarily adequate to make the insert as last described one-quarter inch in external diameter, with 28 exterior threads to the inch for use in quarter-inch plywood. The diameter of the insert may be greater, of course, where necessity so indicates, but it is not desirable to have the threads much, if any, coarser, than 28 to the inch, where such thin plywood is involved.

The insert may be made of the same length for use in quarter-inch plywood as for use in thicker materials, substantially in the proportion shown and described in Figures 10 to 14, in which event the insert would project at the back side of the thin plywood, which would not be objectionable in many situations. In case of need, the measurement of the anchor piece 46 longitudinally thereof may be decreased, as will be understood. For engaging bolts, the diameter of the piece and the size of the internal threads are correspondingly increased, as will be understood.

After the anchorage piece 46 is screwed into the material 45 fully, the key members 51 are driven into place as shown in Figure 11, and thereafter either a stud or other screw fastening may be engaged in the anchorage bushing in accordance with conventional uses of such fastenings.

As shown in Figures 15 to 18, this type of bushing anchorage may be modified by the omission of the end slot 49, a bushing 46' being shown in these last mentioned views, which corresponds in size and dimensions and manner of use to the bushing 46 previously described. This bushing is further modified by the provision of key slots 53 at opposite sides extended longitudinally therein and being of somewhat greater depth relatively than the slot 50 in the previously described form of the invention, so that nails 54 may be driven into the key slots after the bushing has been screwed into place in the body material 45, the nail becoming embedded in the material 45 at each side of the bore into which the bushing is screwed.

It will be apparent that the key devices 51 and 54 will prevent rotation of the anchorage bushing in the material 45 under ordinary usage.

In Figures 19 to 23, a further modification of the bushing is shown in which proportions and manner of use are the same as described in the last preceding two forms of the invention, but instead of the channeled key-slot at the side, a flat 55 is formed on the side of the bushing extending throughout its length. After it is screwed into place in the material 45, a broad semi-oval piece 56 is driven beside the bushing into the material 45, as indicated in Figures 20 and 21. In Figures 24 and 25 a further modification of the anchorage of the bushing is shown, wherein the bushing 57 is formed without interruption of the thread exteriorly, though otherwise conforming generally to the sizes and proportions previously indicated. An opening or passage 58 is formed longitudinally in the wall of the bushing, extending throughout its length and open on both ends, so as to receive a pin 59 of complementary form and size therethrough, which may be inserted slidably in the longitudinal opening, and driven into the material 45 at the inner end of the bore. This has advantages in case the material 45 is quite hard, and might tend to bend the key pieces if driven beside the bushing, and also enhances the security of the hold of the external threads of the bushing in the material 45.

In Figures 26 and 27 a form of the invention corresponding to that shown in Figures 15 to 18 inclusive, is illustrated, except that but one key slot is formed at the sides of the bushing 46—a which in most instances will be found sufficient, a nail 54' being used as a key corresponding to the nail 54 before mentioned, and this anchorage bushing 46—a corresponding in its details to those previously described, according to the nature of the work. In the last mentioned two views there is also illustrated a bracket piece 60 shown held by means of a bolt 61 and nut 62, and indicating how the securing of a piece to the body 45 over the bushing will also serve to hold the key at the side of the bushing against accidental removal or displacement.

The locking pins 51, 56 and the like, may, if desired, be formed of metal or wood or a suitable adhesive may be forced into the key slots so as to form the locking means.

In Figure 28 there is illustrated the use of a concealed locking means which is inserted in the bore before the engagement of the anchorage bushing therein, the structural material in which the bushing is to be engaged being indicated at 63, the bore 64 formed therein for reception of the anchorage member being formed of a slightly greater depth than required for the mere insertion of the anchoage member, but being similarly of a small diameter so that the threads of the anchorage member will press into the material 63. At the inner end of the bore there is inserted a washer 65 of fibrous or other slightly compressible friction material, the thickness of which is sufficient to permit it to be compressed in some degree by the anchorage insert 66 shown in the last mentioned figure, and in this case, the anchorage is of the simplest possible form, being formed without interruptions in the external threads, although its inner end face may be treated or worked to enhance friction, if desired.

It should be noted that the washer 65 is formed with an opening slightly smaller than the threaded bore through the bushing 66 and preferably the stud or other fastening to be engaged in the anchorage shall be threaded over a sufficient part of its inserted end to pass through the bushing 66 and the washer 65, thereby becoming locked by the latter against casual unscrewing, the washer thus being further compacted and adding to the security of the lock upon the bushing. In this way, the single member 65 performs the double function of locking the bushing and the fastening screw engaged through the bushing.

While I have illustrated my invention and described it in a specific manner of use and proportion of parts and nature of materials, it will be understood that this is exemplary, and that incorporation of features of one modification in other forms of the device may be carried out without departing from the spirit of the invention, and likewise, variations in the nature of the materials, proportions, construction and arrangement of parts may also be carried out without departing from the spirit of the invention except as more specifically limited by the appended claims.

While I have referred principally to wood and particularly to plywood or material such as plywood, as the material in or on which my invention is most important at the moment, it will be understood that such references, particularly in the claims, shall include generally compressible materials, including metals, as aluminum, magnesium, lead, plastics, fiber products and other correspondingly compressible materials.

I claim:

1. A device of the character described comprising a tubular body internally and externally threaded, the external threads being traversed by longitudinally extending grooves, there being a diametrical slot at the top of the body the ends of which are arranged over said grooves, and a key adapted to be driven down through one of said grooves and have its head positioned in said slot.

2. A device of the character described comprising a tubular body internally and externally threaded, the external threads being traversed by longitudinally extending grooves, there being a diametrical slot at the top of the body the ends of which are arranged over said grooves, and a key adapted to be driven down through one of said grooves and have its head positioned in said slot, said head being apertured.

3. A device of the class described comprising a tubular body internally and externally threaded said body having a diametrical slot in its top and grooves extending downwardly across the external threads from the ends of said slot adapted to receive keying devices.

WHITNEY E. GREENE.